(12) United States Patent
Sato

(10) Patent No.: US 6,236,514 B1
(45) Date of Patent: May 22, 2001

(54) OPTICAL HEAD DEVICE AND NEAR-FIELD LIGHT EMITTING DEVICE

(75) Inventor: Akira Sato, Shiga-ken (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/625,318

(22) Filed: Jul. 25, 2000

(30) Foreign Application Priority Data

Jul. 28, 1999 (JP) .................................................. 11-213101

(51) Int. Cl.[7] ................................ G02B 3/00; G11B 7/00
(52) U.S. Cl. .......................................... 359/664; 369/112
(58) Field of Search .................................. 359/664, 809, 359/819, 813, 814, 823, 824; 369/43, 112

(56) References Cited

U.S. PATENT DOCUMENTS

| 5,125,750 | 6/1992 | Corle et al. | 359/819 |
| 5,615,203 | * 3/1997 | Fukakusa | 369/244 |
| 5,729,393 | * 3/1998 | Lee et al. | 359/819 |
| 5,793,407 | * 8/1998 | Park et al. | 347/258 |

* cited by examiner

Primary Examiner—Ricky Mack
(74) Attorney, Agent, or Firm—Morrison & Foerster LLP

(57) ABSTRACT

An optical head device which has an optical element and an optical fiber. The optical element is made of a material with a high refractive index and has a planar first reflective surface and a spheroidal second reflective surface. A hole which serves as a light transmitting portion is made in the center B of the first reflective surface, and a concave portion which transmits a divergent bundle of rays emitted from a radiating point A of the optical fiber is made in the center of the second reflective surface. The points A and B are optically in conjugation with each other. The divergent bundle of rays emitted from the radiating point A passes through the concave portion and is incident to the optical element. Then, the light is reflected by the reflective surfaces, thereby being converged on the hole, and is emergent from the optical element through the hole.

13 Claims, 3 Drawing Sheets

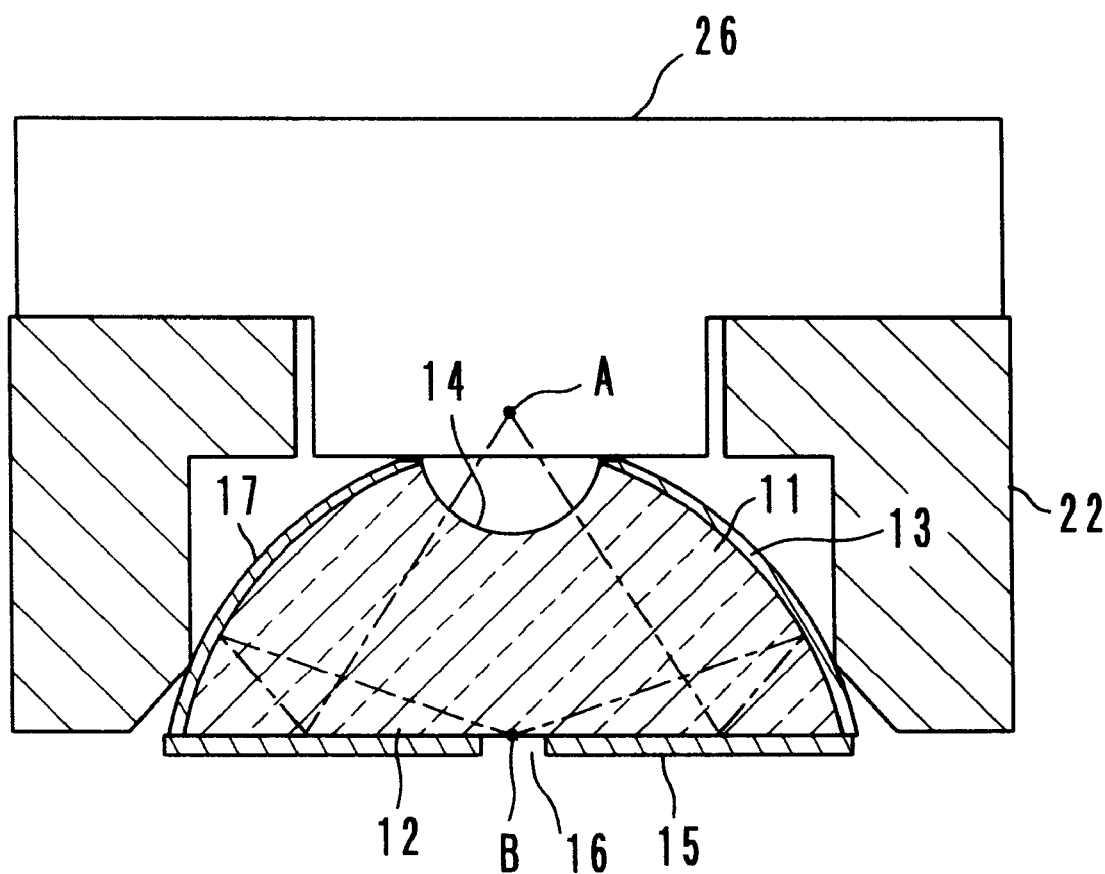

OPTICAL HEAD DEVICE AND NEAR-FIELD LIGHT EMITTING DEVICE

This application is based on application No. 11-213101 filed in Japan, the content of which is hereby incorporated by reference.

BACKGROUND OF THE INVENTION

1. Field of the Invention

The present invention relates to an optical head device and a near-field light emitting device, and more particularly to an optical head device which is suited to be used for a high-density optical memory (record/reading).

2. Description of Prior Art

In the art of optical memories which optically record and read information, in recent years, with speed-up of computer processing and development of multimedia, high-density devices which are capable of recording an extremely large volume of information are demanded, and in order to comply with the demand, a near-field optical recording technique is suggested. In a conventional optical memory using a laser beam, the recording density is limited depending on the diffraction limit of light, and such an optical memory can record and read marks of sizes of at least light wavelength (around 300 nm).

A recently proposed optical memory which uses near-field optics radiates light to a recording medium for recording/reading with the optical head and the recording medium arranged at an interval of only some dozen nanometers. At this time, the optical memory uses a fiber probe with a minuscule aperture smaller than light wavelength and/or an SIL (solid immersion lens) so that a light spot which is smaller than light wavelength can be formed on the recording medium. Thereby, in spite of the diffraction limit, it becomes possible to record and read minuscule marks less than 200 nm.

Incidentally, in the near-field optical technique, in order to obtain a minuscule light spot, it is preferred to converge light to the diffraction limit at a numerical aperture which is as high as possible. For this purpose, U.S. Pat. No. 5,125,750 suggested a method in which a convergent bundle of rays is directed to an SIL made of a material with a high refractive index by use of an objective lens.

In a conventional optical head device using an SIL, specifically, a laser beam is collimated into a parallel bundle of rays and is reflected by a mirror. Then, the laser beam is converged by an objective lens and is incident to the SIL. In this structure, it is necessary to use various optical elements such as a mirror, an objective lens, etc., which indispensably increases the size and weight of the optical head.

Lately, it is suggested to use an SIM (solid immersion mirror) instead of an SIL (see pages 59–62 of Reports of ODF'98, Tokyo, Jun. 16, 1998). The SIM converges light by performing refraction once and reflection twice in a material with a high refractive index, and this eliminates the necessity of using a convergent lens. However, a mirror to reflect a collimated laser beam is still necessary, and it is not perfect as a small and light optical head. Also, since the optical elements such as an SIM, a light source, a mirror, etc. must be assembled, troublesome works, namely optical axis adjustment and focusing must be carried out. Further, there are problems that chromatic aberration may occur because of refraction and that the focal length may shift with a change in temperature.

SUMMARY OF THE INVENTION

An object of the present invention is to provide a small and light optical head device and a near-field light emitting device which are easy to be assembled, and more specifically, do not necessitate an objective lens, a reflection mirror, a focus adjustment mechanism and a chromatic aberration correction mechanism.

In order to attain the object, an optical head device according to the present invention comprises an optical element and a light source. The optical element comprises: a first reflective surface which is planar and which has a light transmitting portion in its center; a second reflective surface which is spheroidal and which converges light on the light transmitting portion; and a concave portion which is located in a center of the second reflective surface and which transmits light. The light source emits a divergent bundle of rays from a point which is a center of the curvature of the concave portion.

In the structure, the divergent bundle of rays emitted from the light source passes through the concave portion and is incident to the optical element. In the optical element, the light is reflected by the first reflective surface and further reflected by the second reflective surface, whereby the light is converged on the center of the first reflective surface. Then, the light is emergent from the optical element through the light transmitting portion.

As the light source, a point light source which emits a divergent bundle of rays from a point, such as an optical fiber, a light guide, an optical waveguide, a laser diode or the like is used. Thereby, neither an objective lens nor a reflective mirror is necessary, and a small and light optical head device can be obtained. Further, because the optical path is formed in one optical element, complicated works, namely, optical axis adjustment and focusing are not necessary. Light emitted from the light source is incident to the optical element through the concave portion, and at this time, refraction by a lens does not occur. Accordingly, chromatic aberration does not occur, and light within a large wavelength range can be used. Moreover, the optical element changes its shape similarly with a temperature change, and the focal length does not change; therefore, a mechanism for adjusting the focus is not necessary.

If the optical element is made of a material with a high refractive index and if the aperture diameter of the light transmitting portion made in the first reflective surface is not more than light wavelength, near field light effuses from the light transmitting portion. Thereby, an optical head device which is suited to be used as a high-density optical memory can be obtained.

DESCRIPTION OF THE DRAWINGS

This and other objects and features of the present invention will be apparent from the following description with reference to the accompanying drawings, in which:

FIG. 3 is a sectional view of the principle part of an optical head device which is a third embodiment of the present invention.

DETAILED DESCRIPTION OF THE PREFERRED EMBODIMENTS

Some embodiments of optical head devices and near-field light emitting devices according to the present invention are described with reference to the accompanying drawings.

First Embodiment; See FIG. 1

Figure 1:
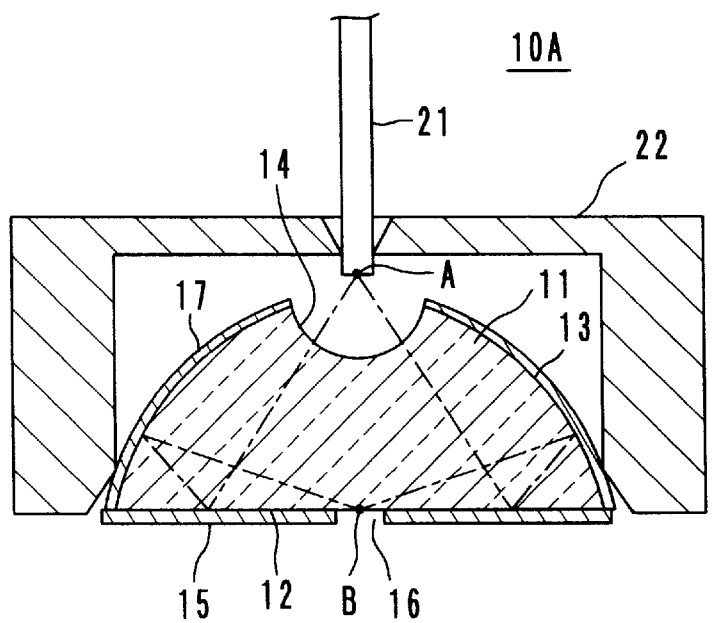
FIG. 1 is a sectional view of the principle part of an optical head device which is a first embodiment of the present invention.

FIG. 1 shows an optical head device 10A which is a first embodiment of the present invention. The optical head device 10A comprises an optical element 11, an optical fiber 21 and a holder 22 which holds these members. The optical fiber 21 is a conventional light guide which is composed of a core and a clad. The optical fiber 21 receives light from a light source which is connected to its unillustrated end and emits the light as a divergent bundle of rays from a point A at the other end.

The optical element 11 is made of a material with a high refractive index (desirably, with a refractive index of 1.6 or more), for example, glass SF57 with a refractive index of 1.83375. The optical element 11 comprises a planar first reflective surface 12, a spheroidal second reflective surface 13 and a concave spherical portion 14 which is located in the center of the second reflective surface 13.

The first reflective surface 12 is a circle with a radius of 0.5 mm. The surface 12 is coated with an aluminum film 15, and a hole 16 with a radius of 0.05 mm is made in the center. The second reflective surface 13 is coated with an aluminum film 17. The concave spherical portion 14 is a sphere with a radius of 0.1 mm of which center is the radiating point A of the optical fiber 21. The second reflective surface 13 is a spheroid which has focal points at the center point B of the first reflective surface 12 and at the radiating point A, and the radiating point A and the center point B are optically in conjugation with each other.

In the structure, a divergent bundle of rays radiated from the point A of the optical fiber 21 is incident to the optical element 11 through the concave spherical portion 14. The light is reflected by the first reflective surface 12 and further reflected by the second reflective surface 13. Then, the light is converged on the center point B of the first reflective surface 12 and is emergent from the optical element 11 through the hole 16. If the hole 16 is very small, specifically, is of a radius of approximately 100 nm, near field light (optical near field) effuses from the hole 16.

As has been described above, in the first embodiment, a divergent bundle of rays directed to the optical element 11 without being refracted is reflected inside the optical element 11 twice and is emergent therefrom through the hole 16. Thus, this optical head device is of a simple structure which requires neither an objective lens nor a reflective mirror. In this structure, because refraction is not performed, correction of chromatic aberration is unnecessary, and neither optical axis adjustment nor focusing is necessary. Moreover, the optical element 11 changes its shape similarly with a temperature change, and focus adjustment is unnecessary.

Second Embodiment; See FIG. 2

Figure 2:
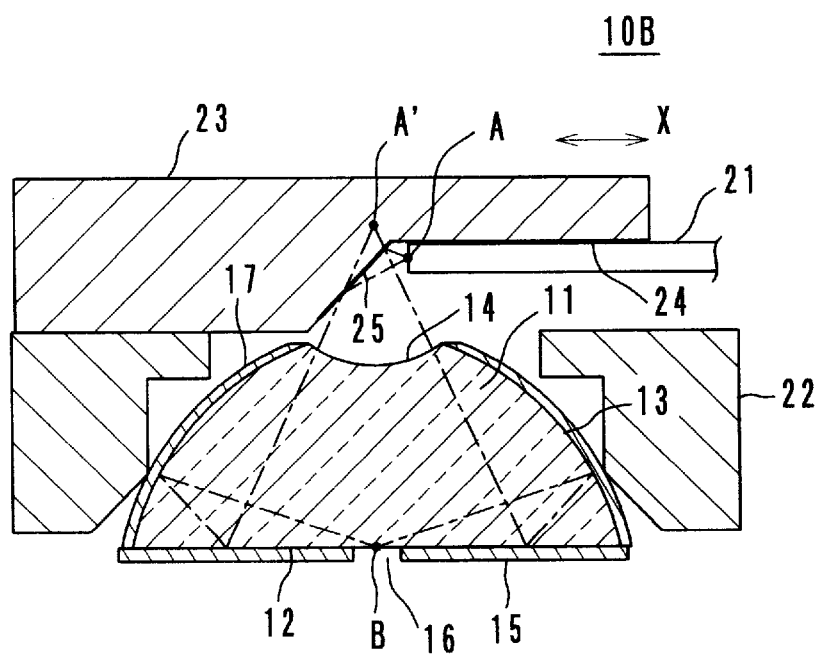
FIG. 2 is a sectional view of the principle part of an optical head device which is a second embodiment of the present invention.

FIG. 2 shows an optical head device 10B which is a second embodiment of the present invention. The optical head device 10B comprises an optical element 11, an optical fiber 21 and holders 22 and 23. The holder 22 holds the optical element 11, and the holder 23 holds the optical fiber 21 and has a planar reflective surface 25. The optical fiber 21 is fitted in a V-shaped groove 24 made in the holder 23.

The optical element 11 is made of glass SF6 with a refractive index of 1.80518, and the other characteristics are same as those of the optical element 11 in the first embodiment. A divergent bundle of rays from the radiating point A of the optical fiber 21 is reflected by the reflective surface 25 of the holder 23 and is incident to the optical element 11 through the concave spherical surface 14. The point A' in FIG. 2 is a mirror image point of the point A through the reflective surface 25, and the concave spherical surface 14 is a sphere with a radius of 0.2 mm of which center is the point A'.

The divergent bundle of rays reflected by the reflective surface 25 is incident to the optical element 11 through the concave spherical portion 14. The light is reflected by the reflective surfaces 12 and 13 and is converged on the center point B of the first reflective surface 12. Then, the light is emergent from the optical element 11 through the hole 16. If the hole 16 is very small, specifically, is of a radius of approximately 100 nm, near field light effuses from the hole 16.

The second embodiment operates in the same way and brings the same effect as the first embodiment does. In the second embodiment, by moving the holder 23 together with the optical fiber 21 in the direction indicated by arrow "X", the optical axis can be adjusted. Also, by moving the optical fiber 21 alone in the direction of arrow "X", focusing can be carried out.

Third Embodiment; See FIG. 3

FIG. 3 shows an optical head device 10C which is a third embodiment of the present invention. The optical head device 10C comprises an optical element 11, a laser diode 26 which is a point light source and a holder 22 which holds the optical element 11 and the laser diode 26.

The optical element 11 is made of glass LaK10 with a refractive index of 1.72000, and the other characteristics of the optical element 11 are same as those of the optical element 11 in the first embodiment. The concave spherical portion 14 is a sphere with a radius of 0.1 mm of which center is the light emitting point A of the laser diode 26.

A divergent bundle of rays emitted from the point A of the laser diode 26 is incident to the optical element 11 through the concave spherical surface 14. The light is reflected by the reflective surfaces 12 and 13 and is converged on the center point B of the first reflective surface 12. Then, the light is emergent from the optical element 11 through the hole 16. If the hole 16 is very small, specifically, is of a radius of approximately 100 nm, near field light effuses from the hole 16. The third embodiment operates in the same way and brings the same effect as the first and second embodiments do.

Producing Method; See FIGS. 4a–4d

Next, a producing method of the optical head devices 10A, 10B and 10C is described. A method of coating the optical element 11 is described especially in more detail.

Figure 4A:
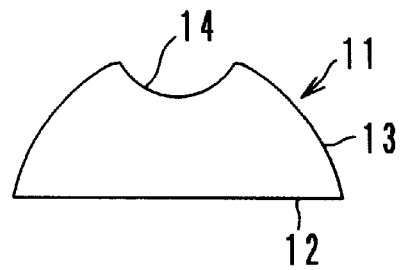
FIGS. 4a through 4d are illustrations which show a process of fabricating the optical head device.
Figure 4B:
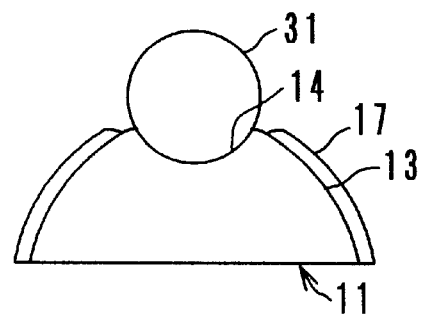
Figure 4C:
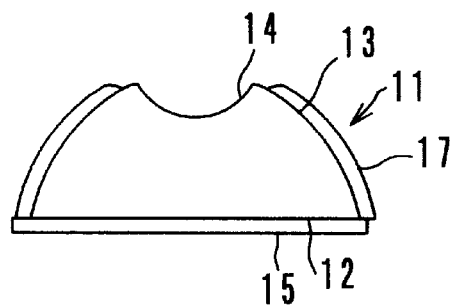
Figure 4D:
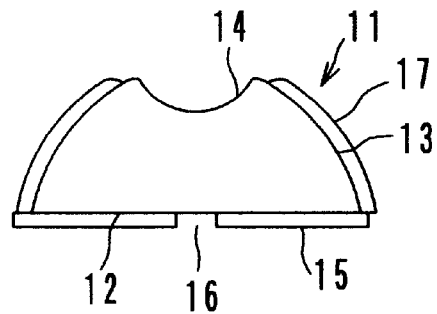

First, an optical element 11 with a spheroid, a plane and a concave spherical portion 14 is formed by a glass mold method (see FIG. 4a).

Next, a plastic ball 31 is mounted on the concave spherical portion 14 as a mask, and an aluminum film 17 is formed on the spheroid by sputtering or the like. In this way, the second reflective surface 13 is formed (see FIG. 4b). Thereafter, an aluminum film 15 is formed on the plane by sputtering or the like, and in this way, the first reflective surface 12 is formed (see FIG. 4c). Then, the aluminum film 15 is partly removed by photolithography so that a hole 16 can be made in the center (see FIG. 4d).

Other Embodiments

The material of the optical element, the material and the forming method of the reflective surfaces, the size and the forming method of the hole, and the type of the light source may be arbitrarily determined. The hole which is a light emerging portion is not necessarily circular and may be slit.

Although the present invention has been described in connection with the embodiments above, it is to be noted that various changes and modifications are possible to those who are skilled in the art. Such changes and modifications are to be understood as being within the scope of the present invention.

What is claimed is:

1. An optical head device comprising:
   an optical element comprising:
      a planar first reflective surface which has a light transmitting portion in its center;
      a spheroidal second reflective surface which converges light on the light transmitting portion; and
      a concave portion which is located in a center of the second reflective surface and which transmits light; and
   a light source which emits a divergent bundle of rays from a point which is a center of the curvature of the concave portion.

2. The optical head device according to claim 1, wherein the optical element is made of a material with a high refractive index.

3. The optical head device according to claim 1, wherein the optical element has a refractive index not less than 1.6.

4. The optical head device according to claim 1, wherein the light transmitting portion has an aperture diameter which is not more than wavelength of light.

5. The optical head device according to claim 1, wherein the spheroidal second reflective surface has focuses on a center point of the first reflective surface and on a center point of the curvature of the concave portion.

6. The optical head device according to claim 1, wherein the concave portion is a sphere which has a center on a radiating point of the light source.

7. The optical head device according to claim 1, wherein the light source comprises:
   an optical fiber; and
   a mirror which reflects light emitted from the optical fiber to make the light incident to the concave portion.

8. A near-field light emitting device comprising:
   a light source which emits a divergent bundle of rays; and
   an optical element to which the divergent bundle of rays emitted from the light source is incident and from which near-field light effuses, said optical element comprising:
      a planar first reflective surface which has, in its center, a light transmitting portion which has an aperture diameter not more than wavelength of light;
      a spheroidal second reflective surface which converges light on the light transmitting portion; and
      a concave portion which is located in a center of the second reflective surface and which transmits light.

9. The near-field light emitting device according to claim 8, wherein the optical element is made of a material with a high refractive index.

10. The near-field light emitting device according to claim 8, wherein the optical element has a refractive index not less than 1.6.

11. The near-field light emitting device according to claim 8, wherein the spheroidal second reflective surface has focuses on a center point of the first reflective surface and on a center point of the curvature of the concave portion.

12. The near-field light emitting device according to claim 8, wherein the concave portion is a sphere which has a center on a radiating point of the light source.

13. The near-field light emitting device according to claim 8, wherein the light source comprises:
   an optical fiber; and
   a mirror which reflects light emitted from the optical fiber to make the light incident to the concave portion.

* * * * *